March 10, 1936.  E. H. PIRON  2,033,864
RAIL VEHICLE
Filed March 12, 1934   3 Sheets-Sheet 1
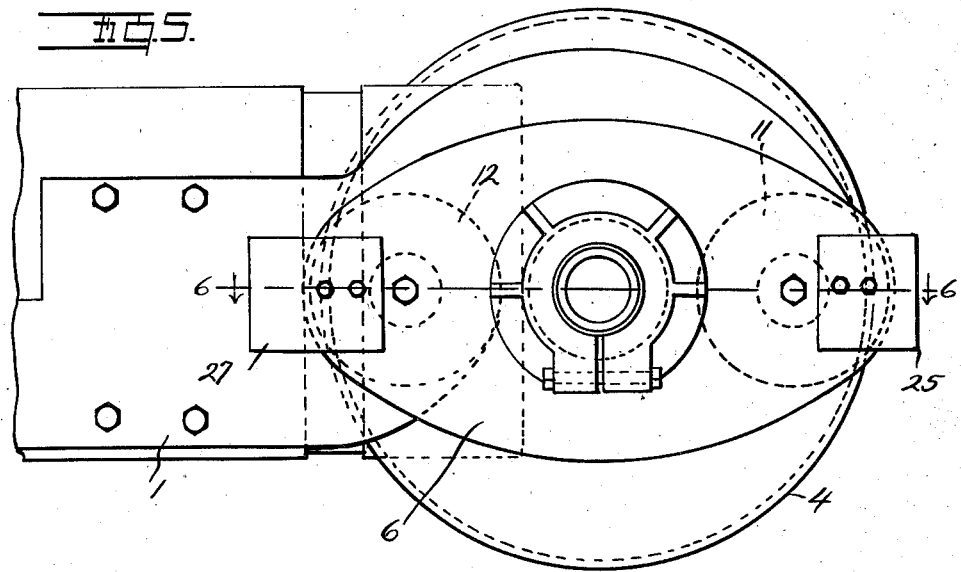
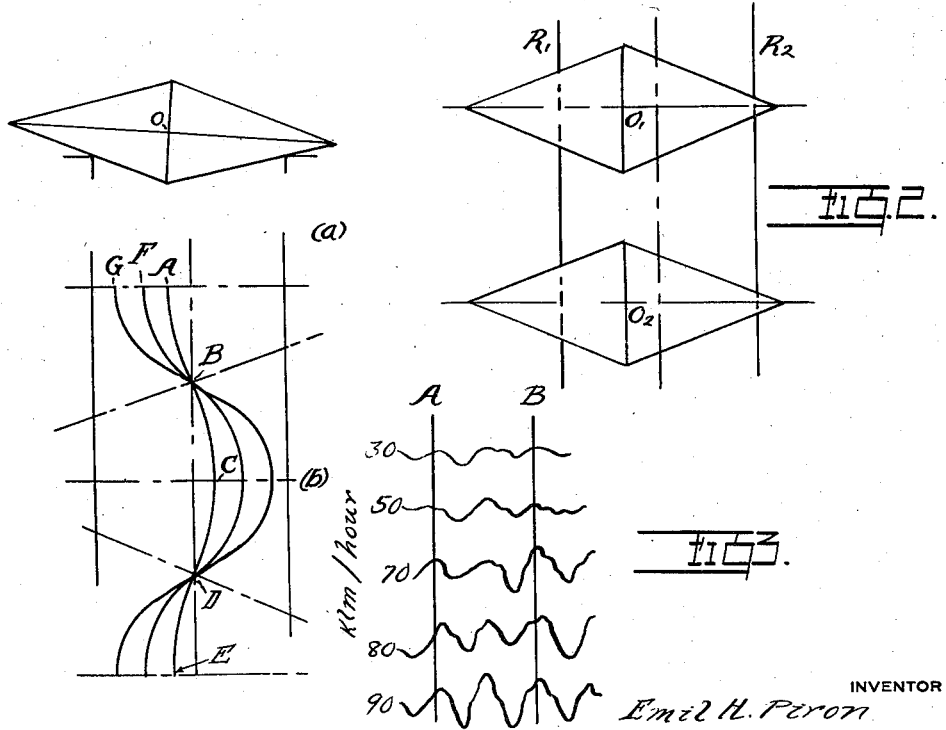
INVENTOR
Emil H. Piron
BY
Whittemore Hulbert Whittemore & Belknap
ATTORNEYS

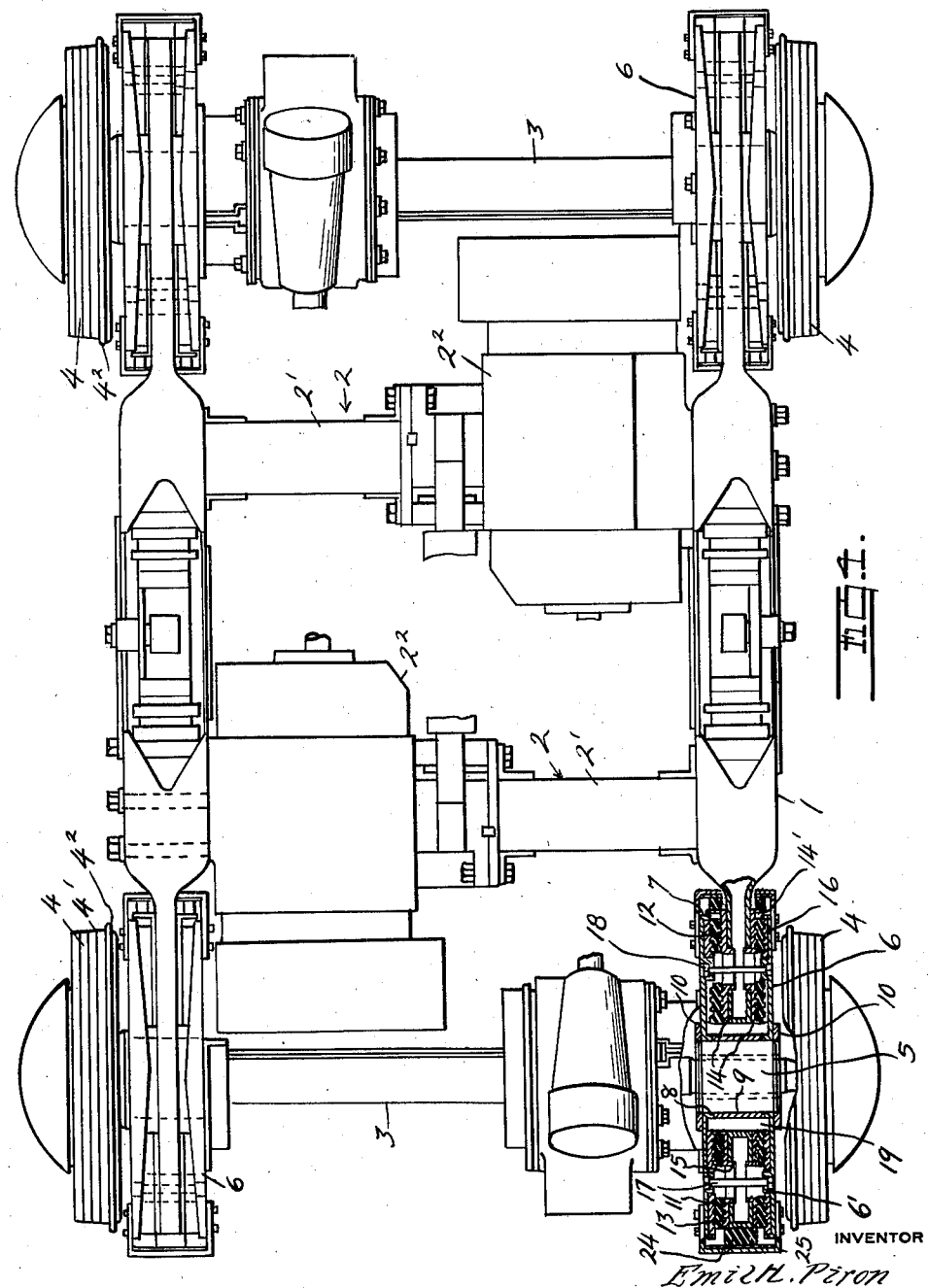

March 10, 1936. E. H. PIRON 2,033,864
RAIL VEHICLE
Filed March 12, 1934 3 Sheets-Sheet 3

INVENTOR
Emil H. Piron
BY
ATTORNEYS

Patented Mar. 10, 1936

2,033,864

UNITED STATES PATENT OFFICE 2,033,864

RAIL VEHICLE

Emil H. Piron, Highland Park, Mich., assignor, by mesne assignments, to Transit Research Corporation, New York, N. Y., a corporation of New York Application March 12, 1934, Serial No. 715,237

8 Claims. (Cl. 105—223)

This invention relates to rail vehicles, all of which are subject to lateral motions which are intensified by increasing vehicular speed and which grow to such magnitude as to comprise the limiting factor in attempting to attain linear speeds in excess of 90 miles per hour. The object of the present invention is to explain the fundamental causes of these lateral movements and to teach the counteractance and apparent elimination thereof in order to thereby open the way to vastly increased rail speeds.

The motions of a rail vehicle are highly complicated for a given vehicle and there are great differences between different vehicles as to weight, length, design, characteristics and conditions of springs and in the condition of the wheels. In fact it is not unusual to find wheels of different size and of different tread contour on the same vehicle. Furthermore, the rails are not perfectly smooth, perfectly parallel or at exactly the same elevation crossways of the track. For these and other reasons it is impossible to make a rail car run on the rails without the wheel flanges contacting one rail or the other in a complicated series of wanderings.

The wheels of rail vehicles are commonly made with coned treads, that is, the tread of the wheel forms the surface of a truncated cone with its apex outside the track and on the continuation of the center line of the axle. It will be shown that this construction necessarily forces the wheel and axle assembly to produce an oscillatory motion cross ways of the track, thereby tending to impress upon the vehicle an oscillatory transverse motion originating within the axle and wheel assembly. In theory, wheels with perfectly cylindrical treads would not produce this undesirable result. Such wheels have in fact been used to overcome such transverse motion in cases in which no other remedy was readily available. However, the cylindrical tread does not constitute a completely satisfactory solution to the problem because wear very quickly changes the shape of the tread to one that appears to be still less desirable than the conventionally coned tread. The great majority of wheels have conical treads comprising parts of cones such that two wheels on the same axle may be considered as parts of the cones having a common base midway of the distance therebetween. Such a geometric figure is called a dicone.

In order to best explain the present invention, reference is made to the following figures of the drawings:

Figure 1 is a diagrammatic illustration of a single dicone resting on rails;

Figure 2 is a diagrammatic illustration of two connected dicones resting on rails.

*Motions of a free dicone*

Figure 6:
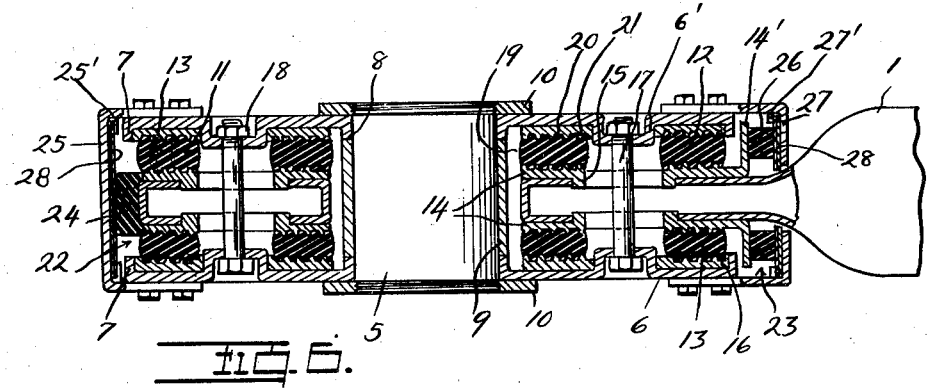

With reference to Figure 1, if we consider the center O of the single dicone as being slightly offset from its mid position to a point A and then freely rolled along the track, the rails of which are assumed to be perfectly straight horizontally and vertically, it can be shown that the center of the dicone will follow a curve starting at A and having a curvature directed toward the center line of the track and crossing the center line at B where the axis of the dicone obtains a maximum angularity with respect to the center line of the rails. From the point B the trace of the center of the dicone changes in direction and follows a curve BC perfectly symmetrical to AB until it reaches the point C at which the position of the axis of the dicone is again at right angles to the center line of the rails. At the point C a condition exactly similar but opposite to that at the starting point A exists and the curve is altered in direction whereupon it crosses the track center line at D and continues to E. At D, as at B, there is no force tending to diminish the angularity of the axis of the dicone as the center thereof crosses the center line of the rails at D so that at the point E an entire cycle is completed and a new cycle starts identical with the first cycle.

It can be proven mathematically, or in a simpler manner, by the use of models, that the undulatory motion of the point O, right and left of the center line of the track, has a wave length which is fixed by the angles of the cones and an amplitude which is fixed by the amount of offset of the center O at the start, each having a constant value as long as the dicone is free to follow its own motion. Thus if the center of the dicone be offset to points F and G, a family of curves of progressively greater magnitude but of the same wave length will be produced.

*Motion of a perfectly flexible truck*

If, now, we take two dicones as illustrated in Fig. 2 and connect them theoretically in such manner that they maintain a fixed distance between centers but otherwise are entirely free to follow their own individual motions, as above described, we then have a rail truck which is perfectly flexible as to all horizontal motions and the motion of the truck is the resultant of the motions of the two dicones. Such resultant necessarily has the same characteristics as the two components,—that is, a constant wave length depending on the angle of the cones and a constant amplitude depending on the offset position of the center at the start.

Motion of a perfectly rigid truck

If the two dicones of Fig. 2 be rigidly connected so that the axes must remain parallel with each other in a horizontal plane but may be relatively displaced in a vertical plane, we then have a truck theoretically perfectly rigid as to all horizontal motions. If such a truck be made to travel on rails each dicone tries to follow its own motion but is unable to do so because it is obliged to participate in the motion of the other dicone. The result is that the motion of the assembly takes place according to a compromise which is possible only because of a certain amount of slippage between the dicones and the rails.

The slippage is divided among each of the four wheels depending upon the forces causing the slippage and the adhesion of the wheels with the rails. If this motion be computed mathematically for a real case, the analysis will result in 24 equations with 24 variables which must be computed for each individual set of conditions, there being 24 different factors which can alter the motions of the truck.

The behavior of dicones as described above is applicable to motions of theoretical vehicles on perfectly straight and perfectly smooth rails. In the case of the perfectly flexible truck consideration of rail joints and low spots in the rails does not alter the general form of the curve,—that is, the wave length and amplitude remain substantially the same. In the case of the perfectly rigid truck, however, there is a vast modification of the curve because the slippage of the wheels on the rails introduces other factors.

Some of these factors are dependent upon the amount of pressure between the wheels and rails which is made to vary periodically because of the change of rail elevation at the joints. Other factors depend upon the rolling motions of the car truck and body about a longitudinal axis parallel to the rails which may and do cause a transverse sliding of the wheels on the rails because of the inertia of the mass of the truck.

The result is that the perfectly rigid truck running on ordinary rails follows a curve which is no longer determined only by the angle of the dicones and their position at the start, but also by depressions in the rail and particularly at the rail joints. It is conceivable and understandable that the action of the rail joints may be secondary and have little influence on the form of the curve in some one particular case. In other cases, the action caused by the rail joints may be predominant to the point of wholly regulating the wave length and amplitude to the apparent total extinction of the wave length and amplitude of the motion that would be obtained on a perfectly straight track with a rigid truck.

Motion of commercial trucks

A number of records are available showing the lateral undulatory motion of commercial trucks. These studies have been made in the United States and in several European countries. All of the records available, without exception, show that the actual motion of trucks has a location, or timing and a wave length regulated by the low rail joints and an amplitude dependent on the condition of the track and on the speed.

Fig. 3 of the drawings is a reproduction of the results of one of these studies, made in France in which the lines A and B transversely of a rail indicate the location of two low (not necessarily adjacent) rail joints residing opposite fairly level rail joints. This test was made by running a train past the lines A and B, the rails having been previously heavily coated on their inside surfaces with clay. The wavy lines are reproductions of the grooves cut in the clay by the wheel flanges of the wheels on one side of the train. Recordings were made at each of the speeds indicated. The flange of each wheel in the entire train cut through the clay in almost identically the same groove cut by the leading wheel at each given speed so that the grooves left in the clay by the flanges of the whole train were scarcely larger than that made by the passage of the first flange. This held true at every speed, as the chart indicates. These tests as well as all other available tests show that the wave length is determined or regulated by the low rail joints and the amplitude by the speed and condition of the track. In other words, all available records show that commercial trucks behave like the theoretical rigid rather than the theoretical flexible truck in that transverse amplitude and wave length are determined by the rail joints rather than by the angle and displacement of the dicones. This further proves that if a rail vehicle of conventional design should fail to follow similar motions it would be the result of a happy but accidental combination of the many variables, above mentioned, which probably could not be reproduced if any one condition, as for instance, a change in spring characteristics, or wheel tread contour, were altered. In other words, if it were possible to find a commercial truck built according to present design which did not hunt it would not prove or teach anything of importance to the industry.

It is to be noted that the wave length here referred to may or may not be equal to the length of one rail. If one rail joint is not low, the effect will not be produced so that the wave length is best described as having a length equal to a rail length or a multiple of whole rail lengths.

Motions of trucks with longitudinally sprung journals

It has been shown previously that theoretically the lateral undulatory motion of pefectly flexible trucks has a wave length regulated by the angle of the cone of the treads, while the wave length of the motion of commercial trucks is generally regulated by the location of the rail joints.

Imagine a truck in which the journal bearings are held in the frame by means of longitudinal springs in such a manner that they can be displaced longitudinally simply by overcoming the reaction of the longitudinal springs, without any friction.

If the longitudinal springs had an infinitely small load deflection ratio, that truck would be a perfectly flexible truck. If the load deflection rotio were infinitely great, it would be a perfectly rigid truck. The motion of the first truck would have a wave length dependent on the cone of the wheel treads. That of the second truck would have a wave length dependent on the location of the low rail joints.

Thus by passing gradually from weak to stiff longitudinal springs, it is possible to pass gradually from one wave length to the other and change the location of the curve, or its equivalent, and the timing with respect to the rail joint.

Now, the behavior of a truck, flexible or rigid, on perfectly straight and parallel rails may be compared to that of a sprung system containing its own excitation and oscillating according to its own frequency, the excitation and frequency in this case having their origin in the cone of the treads, while the effect of the low rail joints which is felt at regular intervals may be compared to that of a periodic disturbance acting on said sprung system.

It is thus conceivable that it is possible to correlate the frequency and timing of the disturbance with the frequency and timing of the self exciting or induced motion in such manner that one balances the other so that the disturbance practically counteracts the effect of the self excitation.

Since the sizes and conditions of the dicones vary with wear it is also readily seen that the frequency and timing of the motion originating in the cone of the treads may and does change in service so that it is highly desirable to provide means to regulate the frequency and timing of the induced motion accordingly.

It has been found by tests that it is possible to accomplish this by the use of longitudinal springing to the extent that the sprung system apparently functions without substantial oscillation even at high speeds. In a number of installations on various trucks including different types of street cars and interurban cars such springing has led to success in every instance attempted so that it can be said that the theory is applicable in the generality of cases. Best results have been obtained in trucks constructed according to the teachings herein and employing the frame construction and journal bearing relation of the general type set forth in my copending application Serial Number 695,911 filed October 30th, 1933, with the journal sprung teachings of my copending application Serial Number 664,247 filed April 3rd, 1933. While these teachings are applicable to the construction of any type truck, the truck and springs of the two copending applications are preferred because the approximate characteristics required for longitudinal springing may be readily determined and because such springs are easily designed so as to make it possible to change their characteristics at low expense of time and money, as may be required for various type work varying from a small street car to a heavy, very fast interurban or a high speed train such as is now being developed. The actual limits of longitudinal springing range from $\tfrac{1}{16}$ to $\tfrac{1}{8}$ of an inch for each journal depending on total weight on all wheels and the individual pressure of each wheel on the rails, the lower limit being used for very heavy trucks and the upper limit for light trucks. These figures are not given as limits for the invention but merely as indicative of the resiliency found necessary in the particular trucks constructed to date under these teachings. The trucks referred to are now in service under street car and high speed interurban bodies.

Figure 7:
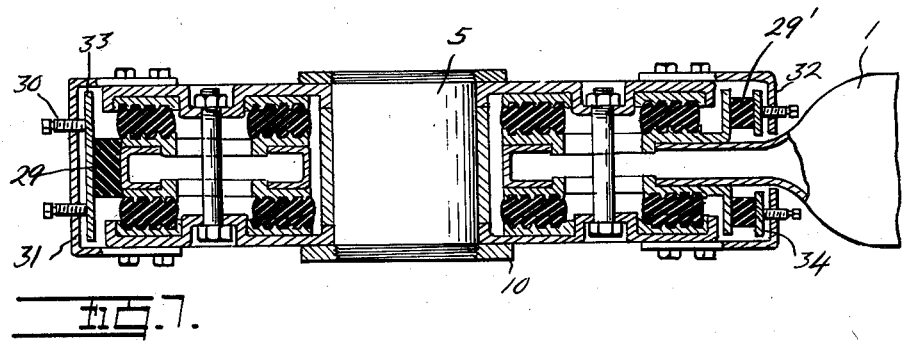
Figure 8:
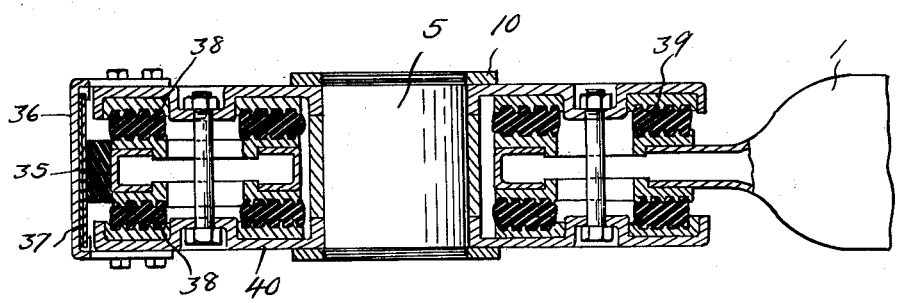

In order to show the construction which I have found particularly suitable to embody this invention, reference will now be had to the remaining figures of the drawings, wherein Figure 4 is a top plan view, with portions in section, of my improved truck;

Figure 5 is a side elevation of one journal spring assembly;

Figure 6 is a cross section on the line 6—6 of Figure 5;

Figures 7 and 8 are views similar to Figure 6 of modified forms of journal spring assembly.

The frame of the truck for the rail vehicle, such as a street car, as illustrated particularly in Figure 4, comprises the side girders 1 and the cross beams 2 connecting the side girders and rigidly secured thereto. The cross beams, as shown, are each formed of the section 2' and the motor housing 2² rigidly secured together. Both the side girders and the sections 2' of the cross beams are preferably formed of metal, such as sheet steel, and the side girders and the cross beams together form a rectangle intermediate the ends of the side girders. The side girders extend past or beyond the rectangle, both fore and aft thereof, and comprise supports for the journal bearings in which the axles 3 are journalled. The axles are located fore and aft of the frame rectangle and each axle is journalled near its ends in a pair of journal bearings located at corresponding ends of the side girders. The rail engaging wheels 4 are secured to the ends of the axles adjacent the journal bearings and these wheels each have the conical tractive surface 4' and the annular flange 4². The conical tractive surface and the annular flange are respectively engageable with the top and a side of one of the rails forming the track. The conical tractive surfaces of the two wheels of each axle may be considered parts of a dicone.

As shown particularly in Figures 4, 5 and 6, 5 are the journal bearings over which the side girders 1 pass. The end portions or journal bearing supporting portions of the side girders are upwardly offset and their lower edges are curved to pass over the journal bearings and to provide for locating the axles of the journal bearings preferably in the horizontal median planes of the main portions of the side girders and to also provide for space or clearance between the lower edges and the journal bearings.

The truck frame is yieldably supported upon the journal bearings by individual springing systems or springs and since each springing system or spring is like the others, but one will be described. In detail, 6 are elongated plate members preferably of oval shape and formed of sheet metal and reinforced by the peripheral flanges 7. These plate members are on opposite sides of and spaced from the adjacent end portion of the side girder and the peripheral flanges extend toward the end portion. The plate members are also formed with the central annular flanges 8 in axial alignment and extending toward each other and these flanges encircle and have a close fit with the journal bearing 5. 9 is the sleeve also encircling the journal bearing and located between the flanges 8 and forming a spacer for the plate members. 10 are nuts threaded upon the ends of the journal bearing and adapted to abut the plate members to secure the plate members, sleeve and journal bearing together in rigid assembly. 11 and 12 are pairs of resilient cushioning elements located respectively fore and aft and, as shown particularly in Figures 4, 5 and 6, these cushioning elements are equidistant from the axis of the journal bearing and preferably have their axes in the same horizontal plane as the axis of the journal bearing. These pairs of resilient cushioning elements connect the associated side girder to the journal bearing through the plate members and transmit the loading imposed on the side girder for the journal bearing to the journal bearing or side girder.

Each pair of resilient cushioning elements comprises the axially aligned circular masses or blocks of rubber 13 on opposite sides of the adjacent end portion of the side girder with one rubber mass between the end portion and one of the plate members and the other rubber mass between the end portion and the other of the plate members. 14 are circular disks adjacent the end portion and having the central annular flanges 15 extending through the aligned holes in the opposite side walls of the end portion and 16 are circular disks adjacent the plate members 6 with their axes registering with those of the rubber masses 13 and the circular disks 14.

The plate members 6 are urged toward each other by the pair of bolts 17 and the nuts 18 preferably equi-distant from the journal bearing and also by the above mentioned nuts 10. Each bolt 17 extends through the plate members 6 in approximate axial alignment with one pair of the rubber masses 13 and the associated disks 14 and 16. These rubber masses have the central holes 19 therethrough and the diameters of these holes and also the internal diameters of the annular flanges 15 are of sufficient size to provide ample clearance for the bolts. The arrangement is such that the plate members are urged toward each other in a manner to impose a substantial and continuous pressure in a horizontal direction on the masses of rubber of sufficient magnitude to set up a frictional engagement between the masses of rubber and the disks 14 and 16 capable of obviating slippage of the rubber masses during operation without the necessity of other bonding means.

However, to resist undue slippage of the masses of rubber in case of accidentally severe loading, the disks 14 and 16 are corrugated or more particularly provided with concentric grooves 20 which are engaged by the concentric ribs 21 upon the rubber masses 13. Also the disks 16 are centrally apertured to sleeve over and fit the bosses 6' upon the plate members 6.

In operation, relative movement of a side girder and an associated journal bearing in upward and downward directions in a vertical plane and in fore and aft directions and the loading caused thereby is in a direction substantially normal to the direction of the clamping forces exerted upon the masses of rubber, so that the masses are subjected to shear stresses and the disks 14 and also the disks 16 and the plate members 6 constitute shear members or plates. Relative lateral or transverse movement of a side girder and an associated journal bearing is resisted by compression of the rubber. Also the resistance offered by the masses of rubber increases with the amount of relative movement in any direction. The individual springing systems or springs, each of which comprises these masses of rubber, are capable of substantial deflection and are of substantially constant load deflection ratio in a vertical plane to increase the dynamic pressure of the wheels of the truck upon the rails forming the track to thereby increase the dynamic adhesion between the wheels of the truck and the rails.

The construction of the truck frame and also the construction of the individual springing systems or springs are such that the frame has a stiffness or load deflection ratio in every direction, including longitudinal, lateral and vertical directions, which is considerably greater than the stiffness or load deflection ratio of the individual springing systems or springs, so that the latter are capable of yielding an amount substantially greater than the amount of distortion of the frame. As a result the springs must yield before the frame can distort and an actual displacement of any axle is accompanied by a lesser distortion of the frame, so that even though the other axle of the truck should follow the frame it would not result in parallelism of the axles. Also, since the individual springing system or springs increase their resistance with an increase of the tendency of the axles to assume greater angular positions relative to their normal or true center positions, these springing systems or springs function to return the axles to their normal positions before the wheel flanges contact with the rails.

The above truck is subject to lateral undulatory oscillations and follows a curve which is determined by the depressions in the rails and particularly at the rail joints and which is also determined by the angle of the conical tractive surfaces of the wheels forming parts of the dicones and their positions relative to the rails at the start. The rail depressions cause the truck to be subject to lateral undulatory motion approaching the motion of rigidly connected dicones and having a wave length equal to one or a multiple of a whole number of rails.

In order to counteract the effect of the rail depressions, the characteristics of the lateral undulatory motion caused by the angle of the conical tractive surfaces and their positions relative to the rails at the start are controlled so that this lateral undulatory motion has a wave length equal to and of opposite phase to that of the lateral undulatory motion determined by the rail depressions. For this purpose fore and aft springs are provided for the journal bearings, these springs providing for longitudinal resilient movement between the journal bearings and the frame of the truck to secure a lateral undulatory motion approaching the motion of free dicones. The fore and aft springs have such resilience that the self exciting or induced lateral undulatory motion has substantially the identical wave length of the lateral undulatory motion regulated by the rail depressions and also has a timing such that the two undulatory motions occur in opposite phase.

Referring to Figures 4, 5 and 6, 22 and 23 are the springs fore and aft of each journal bearing 5. The spring 22 comprises the single resilient cushioning element 24 which is formed of a mass or block of rubber. This mass or block of rubber is located between the outer end of the associated side girder 1 and the abutment member 25, which latter is secured to the plate members 6. The mass or block of rubber 24 fits the outer end of the side girder and the abutment member is U-shaped and has its legs secured to the plate members and its base located beyond the outer ends of these plate members. The spring 23 comprises the pair of resilient cushioning elements 26 each of which is formed of a mass or block of rubber. These masses or blocks of rubber are located at opposite sides of the end portion of the associated side girder 1 longitudinally inwardly of the frame of the truck beyond the plate members 6. Each mass or block of rubber 26 is located between the arcuate flange 14' and the abutment member 27. The flange is formed upon the disk 14 and is spaced from the adjacent mass or block of rubber 13 and the inner end of the adjacent plate member 6, and the abutment member, as shown in the present instance, is an angle shaped member having one flange or leg secured to the adjacent plate member.

The masses or blocks of rubber 24 and 26 yield longitudinally of the frame of the truck a clearly perceptible amount upon being subjected to a force equal to the rotative force sufficient to cause slippage between a wheel of the truck and its rail. In installations made thus far, the range of yield has been approximately from $\frac{1}{16}$ to $\frac{1}{8}$ of an inch for each journal bearing, the lower limit being used for very heavy trucks and the upper limit for light trucks. The combined size of the masses or blocks of rubber 26 equals that of the mass or block of rubber 24, so that equal resistances are exerted by the pairs of masses or blocks of rubber 26 and by the mass or block of rubber 24 to relative movement in opposite directions of the journal bearing and the frame of the truck.

As shown particularly in Figure 6, one or more shims 28 are provided between the masses or blocks of rubber 24 and 26 and their respective abutment members to alter the characteristics of the self exciting or induced lateral undulatory motion so that it will have a wave length equal and in opposite phase to that of the lateral undulatory motion regulated by the rail depressions to counteract the same. This provision for the adjustment of the masses or blocks of rubber provides for varying the yield of the same longitudinally of the frame but as above stated the yield is in a clearly perceptible amount and according to a predetermined proportion with the weight of the rail vehicle including its trucks, the yield being produced by a force equal to that necessary to slip the wheels on the rails.

Suitable means, such as the flanges 25' and 27', are provided upon the abutment members 25 and 27 respectively for preventing accidental disengagement of the shims.

As shown in Figure 7, the adjustment of the fore and aft springs 29 and 29' is secured by means of the set screws 30. These set screws threadedly engage the abutment members 31 and 32 and abut the plates 33 and 34 which are in contact with the springs 29 and 29' respectively.

In the modification illustrated in Figure 8, the lateral undulatory motion regulated by the rail depressions and the self exciting or induced lateral undulatory motion are made to counteract each other by providing the spring 35 between the outer end of the associated side girder and the abutment member 36. This spring is formed in the same manner as the spring 22 and its yield may be adjusted by one or more shims 37 corresponding to the shims 27, or by set screws corresponding to the set screws 30. In this modification, the spring 35 when assembled in position exerts pressure upon the pairs of resilient cushioning elements 38 and 39, which correspond to the pairs of resilient cushioning elements 11 and 12. This pressure is exerted through the medium of the abutment member 36, the plate members 40 and the parts associated therewith and is such that the pairs of resilient cushioning elements are subjected to shear stresses. As a result, the spring and the cushioning elements function as fore and aft springs to regulate the self exciting or induced lateral undulatory motion. In the installations made thus far this modification has been found very satisfactory.

What I claim as my invention is:

1. In combination, in a rail truck subject to a lateral undulatory motion during travel having a wave length regulated by low spots of rail joints, a truck frame having journal bearings, said journal bearings being freely sprung in a fore and aft direction with respect to said frame, conical wheels from which said frame is supported, said springs having such resilience that a second lateral undulatory motion is induced in said truck by the conicity of said wheels and the characteristics of said springs which has substantially identical wave length with the motion regulated by the rail joints and which has a timing such that the two undulatory motions occur in opposite phase.

2. In combination, in a rail truck subject to a lateral undulatory motion having a wave length regulated by the low spots of rail joints, conical wheels, a truck frame having journal bearings, vertical springs capable of substantial deflection between said journal bearings and said frame adapted to increase the adhesion of the wheels and rails at speed, and fore and aft springs between said journal bearings and said frame, said fore and aft springs having free resilience such that a second lateral undulatory motion is induced by the wheels which has substantially identical wave length with the motion regulated by the rail joints and which has a timing such that the two undulatory motions occur in opposite phase.

3. In combination, in a rail truck subject to a lateral undulatory motion having a wave length regulated by the low spots of rail joints, conical wheels, a truck frame having journal bearings, vertical springs capable of substantial deflection in accord with a substantially constant load deflection ratio, said springs being between said journal bearings and said frame and being adapted to increase the adhesion of the wheels and rails at speed, and fore and aft springs between said journal bearings and said frame, said fore and aft springs having free resilience such that a second lateral undulatory motion is induced which has substantially identical wave length with the motion regulated by the rail joints and which has a timing such that the two undulatory motions occur in opposite phase.

4. In combination, in a rail truck subject to a lateral undulatory motion having a wave length regulated by low spots of rail joints, a truck frame having journal bearings, and fore and aft springs of elastic material between said journal bearings and said frame, said springs having substantial free resiliency whereby a second lateral undulatory motion is induced, said springs having such characteristics that the wave length and timing of the induced motion occurs in opposite phase with the first named motion.

5. In combination, in a rail truck having conical wheels and subject to a lateral undulatory motion having a wave length regulated by low spots of rail joints, a truck frame and journal bearings, vertical springs of substantially constant load deflection ratio between said journal bearings and said frame, fore and aft springs having substantial free resiliency between said bearings and said frame whereby a second lateral undulatory motion is induced, and means for adjusting said springs as to fore and aft characteristics whereby the wave length and timing of the induced motion may be made to equal and to be in opposite phase with the first named motion.

6. In combination, in a rail truck having conical wheels and subject to a lateral undulatory motion having a wave length regulated by low spots of rail joints, a truck frame and journal bearings, fore and aft springs between said journal bearings and said frame, said springs having substantial resiliency whereby a second lateral undulatory motion is induced by the shape of said wheels, lateral springs between said journal bearings and said frame yieldingly resisting axial movements of said bearings with respect to said frame, and means for adjusting said fore and aft springs whereby the wave length and timing of said induced motion may be made to occur in opposite phase with said first named motion.

7. In combination in a rail truck including a frame, coned wheels, axles, journal bearings and springs between said journal bearings and said frame yieldingly resisting all relative motions of said frame and journal bearings, the truck being adapted to follow a horizontal weaving travel regulated by the low spots of rail joints under an adjustment of said springs to an infinitely great load deflection ratio and to follow a horizontal weaving travel regulated by the conicity of said wheels and the amount of offset of said wheels from truly centered position on the rails, under a theoretical perfectly flexible connection between said axles and said frame, said springs having characteristics such that the tendency to assume the motion regulated by the low spots of the rail joints and the tendency to assume the motion induced by the flexibility thereof substantially counteract each other.

8. In combination in a rail truck including a frame, coned wheels, axles, journal bearings and springs between said journal bearings and said frame, said axles being contained by said bearings for rotation and being fixed against axial sliding with respect thereto, said journal springs yieldingly resisting all tendency toward lateral and fore and aft motions of said axles with respect to said frame, said frame being freely sprung vertically with respect to said journal bearings for substantial motion with respect thereto, said truck being adapted to follow a horizontal weaving travel regulated as to wave length by the low spots of rail joints upon theoretical adjustment of said springs in a fore and aft direction for an infinitely great load deflection ratio and to follow a horizontal weaving travel dictated as to wave length by the conicity of said wheels upon theoretical adjustment for an infinitely small load deflection ratio, said springs having a load deflection ratio in a fore and aft direction such that the tendency of said truck to assume the motion regulated by said low rail joint spots is substantially counterbalanced by the induced tendency to assume the motion dictated by the conicity of said wheels.

EMIL H. PIRON.